United States Patent
Heurtaux et al.

(10) Patent No.: US 6,728,516 B1
(45) Date of Patent: Apr. 27, 2004

(54) DATA TRANSMISSION METHOD BY RADIOCOMMUNICATION CHANNEL

(75) Inventors: Frédéric Heurtaux, Le Puy Sainte Réparade (FR); André Sevens, Saint Leu la Forêt (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/445,123

(22) PCT Filed: Jun. 4, 1998

(86) PCT No.: PCT/FR98/01131
§ 371 (c)(1),
(2), (4) Date: Apr. 3, 2000

(87) PCT Pub. No.: WO98/56134
PCT Pub. Date: Dec. 10, 1998

(30) Foreign Application Priority Data

Jun. 6, 1997 (FR) .............................. 97 07035

(51) Int. Cl.⁷ .......................... H04B 17/00; H04B 1/10; G06F 11/00; G01R 31/28
(52) U.S. Cl. ................... 455/67.13; 455/67.11; 455/63.1; 455/296; 714/704; 714/744
(58) Field of Search .................. 455/67.11, 67.13, 455/63.1, 226.1, 423, 230, 425, 268, 296; 340/7.32, 7.33; 370/465, 337, 347; 714/701, 762, 704, 744, 758

(56) References Cited

U.S. PATENT DOCUMENTS

| | | | |
|---|---|---|---|
| 4,495,619 A | * 1/1985 | Acampora | 370/207 |
| 5,121,395 A | 6/1992 | Millar | |
| 5,719,884 A | * 2/1998 | Roth et al. | 714/755 |
| 5,757,813 A | * 5/1998 | Raith | 714/708 |
| 5,822,315 A | * 10/1998 | de Seze et al. | 370/337 |
| 5,864,570 A | * 1/1999 | Dorenbosch et al. | 714/704 |
| 6,195,337 B1 | * 2/2001 | Nystrom et al. | 370/252 |

FOREIGN PATENT DOCUMENTS

| | | |
|---|---|---|
| EP | 2 216 752 A | 10/1989 |
| EP | 0 727 891 A2 | 8/1996 |
| WO | WO 95/27345 | 10/1995 |
| WO | WO-97/15131 | 4/1997 |

* cited by examiner

Primary Examiner—Vivian Chin
Assistant Examiner—Raymond B. Persino
(74) Attorney, Agent, or Firm—Greenberg Traurig LLP; Eugene C. Rzucidlo

(57) ABSTRACT

The process for transmitting data between a radio transmitter rig and a receiver rig, through a disturbing transmission medium, consists in:

Figure 1:
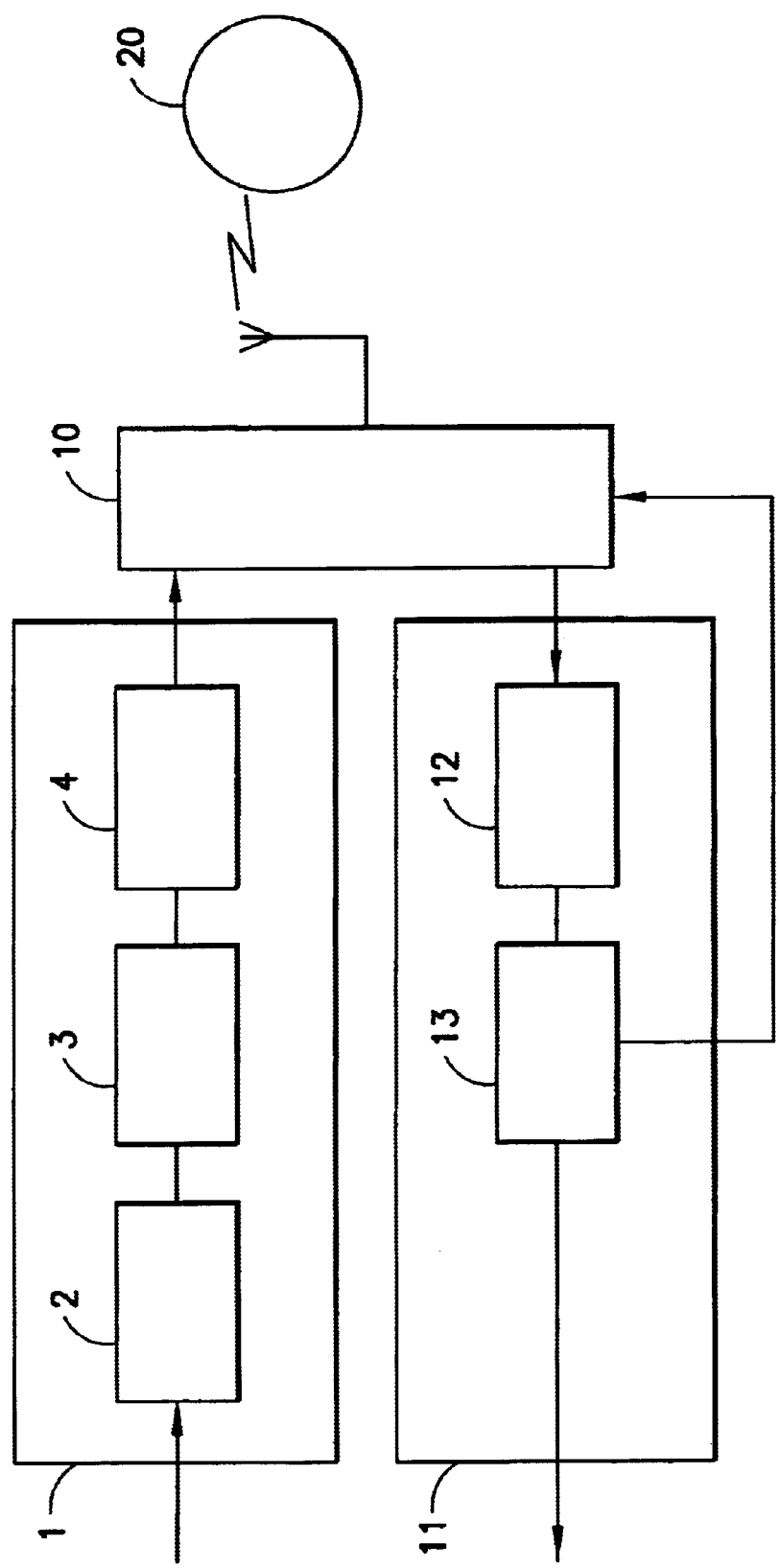

grouping the data to be transmitted into blocks (Bi), adding redundancy information thereto, and splitting the block (Bi) up into a determined number of bit packets (Pj) and, at the receiving end, an attempt is made to reconstruct the data block (Bi) by utilizing the redundancy information, a process in which:
a quality is estimated in respect of the transmission of data and
a minimum number of packets (Pj) of the block (Bi) are transmitted, which number is sufficient to reconstruct the block (Bi) and, at the receiving end, the attempted reconstruction of the block (Bi) is performed by investigating the minimum number of packets (Pj).

19 Claims, 2 Drawing Sheets

DATA TRANSMISSION METHOD BY RADIOCOMMUNICATION CHANNEL

The transmission of data, between a transmitter and a receiver which are separated by a transmission medium which disturbs their transmission, must be protected against these disturbances which give rise to errors at the receiving end.

The data can for example be supplemented with a simple parity bit or a relatively short codeword for detecting one or more errors in a block of data received and the receiver rerequests, if it is equipped for transmission, retransmission of the block in the event of an error.

In the case of the problem from which the present invention stems, radio transmission is involved, as in a GSM telephone network.

For radio transmissions, atmospheric glitches and those due to the relief are liable to disturb, sometimes very greatly, the transmissions. Therefore, it is necessary to be able to tolerate errors, without having to request retransmission, which would run the risk of being disturbed all the same. The useful data are then supplemented with redundancy data which make it possible not only to detect, up to a determined number, the errors in a data block, but also to locate and hence to correct, by inversion, the erroneous bits of the block.

Stated otherwise, taking the example of blocks of useful data which, for some of these blocks, differ from one another by just a single bit and may therefore be mistaken for one another in the event of an error in this bit at the receiving end, the adding of the redundancy bits, which form a particular signature for each block, allows these protected blocks to then differ by N bits.

If therefore one of the blocks thus protected is marred by from 1 to N−1 errors in determined bits which would tend to transform it into another block, it will be detected since the erroneous block will not exhibit the intended correlation between all its bits, which correlation is generated by the redundancy. If the number of erroneous bits does not exceed half the "distance" of N bits separating, or differentiating, the block considered from the other blocks, a correction of these bits by virtue of the redundancy reestablishes the integrity of the block.

Thus, at the receiving end, and for each possible error-free block, the search for its representation is extended to a constellation of representations which differ therefrom only by from 1 to N/2 bits (erroneous), which erroneous representations it will be decided to recognize finally as being in reality the error-free block considered.

Intense radio disturbances of relatively long duration may however nearly interrupt any reception of a data block and therefore cause an error in a number of bits which is greater than that which the redundancy makes it possible to tolerate. In order to guard against the effects of these disturbances, the transmission of the block is spread over time by splitting it up into packets transmitted in successive bursts, each burst being able to include several packets, but belonging to different blocks.

Furthermore, the redundancy does not take the form of specific bits all of which would run the risk of being lost with a burst, that is to say not involving a juxtaposing of redundancy bits with the useful data bits but rather a global transformation, by an algorithm, of the representation of the block of useful data into another redundant representation, in one piece. The useful information and the redundancy are thus integrated, or indivisible in transmission, into the entirety of the new block and the redundancy therefore exists at every point of this new block of increased size.

The risk linked with the loss of a burst thus affects several different blocks rather than just a single block but, on the other hand, the transmission of each block is affected in only a much more limited manner by the loss of a burst and the redundancy is sufficient at the receiving end to reconstruct the data of the blocks transmitted, by an algorithm for extracting the useful data, which is the inverse of the transmission algorithm.

Such a mode of secure transmission is used for example in a GSM radiotelephony terminal. At the receiving end, the terminal receives a determined number of frames of bursts forming a block of data with redundancy. This redundancy nevertheless has the drawback of requiring logic processing of the bits according to the extraction algorithm, and hence of operating, and powering, a processing circuit so increasing the power consumption of the radio circuits. This is also true in respect of transmission. The same holds for the standby state in which the terminal receives a frame cyclically.

Now, the endurance of the supply to portable radio terminals is relatively limited.

In a general manner, the present invention aims to limit, at least at the receiving end, the excess consumption, electrical or in terms of machine time, linked with redundancy, without however losing the protection offered by the latter.

For this purpose, the invention relates to a process for transmitting data by radio pathway between a transmitter rig and a receiver rig, through a disturbing transmission medium, in which:

the data to be transmitted are grouped into blocks,
redundancy information is added to each block to be transmitted, and
the block is split up into a determined number of bit packets and, at the receiving end,
an attempt is made to reconstruct the data block from packets received, by utilizing the redundancy information, a process in which:
a quality is estimated in respect of the transmission of data by the radio pathway and
a minimum number of packets whereby it is possible to reconstruct each block with the aid of the redundancy information is determined therefrom,
a number of packets of the block which is at least equal to the minimum number is transmitted and,
at the receiving end, the attempted reconstruction of the block is performed by investigating a number of packets corresponding to the minimum number.

Thus, having estimated the quality of the transmission pathway, it is possible to choose to transmit a number of packets which is less than the determined number and greater than or equal to the minimum number estimated to be necessary.

In a first case, of transmission of the minimum number of packets, the receiver rig will, a priori, investigate all the packets received, although it is not however excluded from attempting the reconstruction on the basis of a still lesser number if the actual quality is better than that scheduled. Stated otherwise, the correspondence alluded to above can in general be an equality between the minimum number and the actual number of packets investigated, but a variation, in one direction or in the other, in the actual quality of transmission can however give rise to a modulation of the number of packets investigated with respect to the number considered, a priori, as the minimum sufficient.

The concept of the invention, which consists ultimately in discarding the packets estimated to be superfluous, can be applied exclusively at the transmission end, but its application simultaneously benefits the transmitter rig, whose radio power circuits in particular will operate less often, and the receiver rig, at reduced traffic. In fact, the volume of data processed in the receiver is limited to a strict minimum and circuits performing the analysis can thus be kept quiescent for longer or else they can be assigned to other tasks. Additionally, even if the reconstruction of the block, on the basis of a reduced number of packets, is more complex, it is possible to save energy on account of the non-investigation, during radio reception or processing, of all the packets of the block.

In a second case, of transmission of the determined number of packets, the concept of the invention is then applied at the receiving end only, where the estimation of quality is utilized, with the advantages mentioned above.

Finally, the mixed case or cases of transmission of a number of packets which is greater than the minimum number and less than the determined number has, to a lesser degree, the advantages of the first case, but on the other hand makes it possible to tolerate an error in the estimation of the quality of the link since the receiver rig has available at least one additional packet as compared with the estimated minimum, as has been alluded to above.

It will be noted that the invention applies advantageously to radio transmissions, but not exclusively. It will be understood that the data transmission considered designates a digital transmission, without concerning the significance of the data themselves, that is to say it may in particular involve digitized voice signals.

Figure 2:
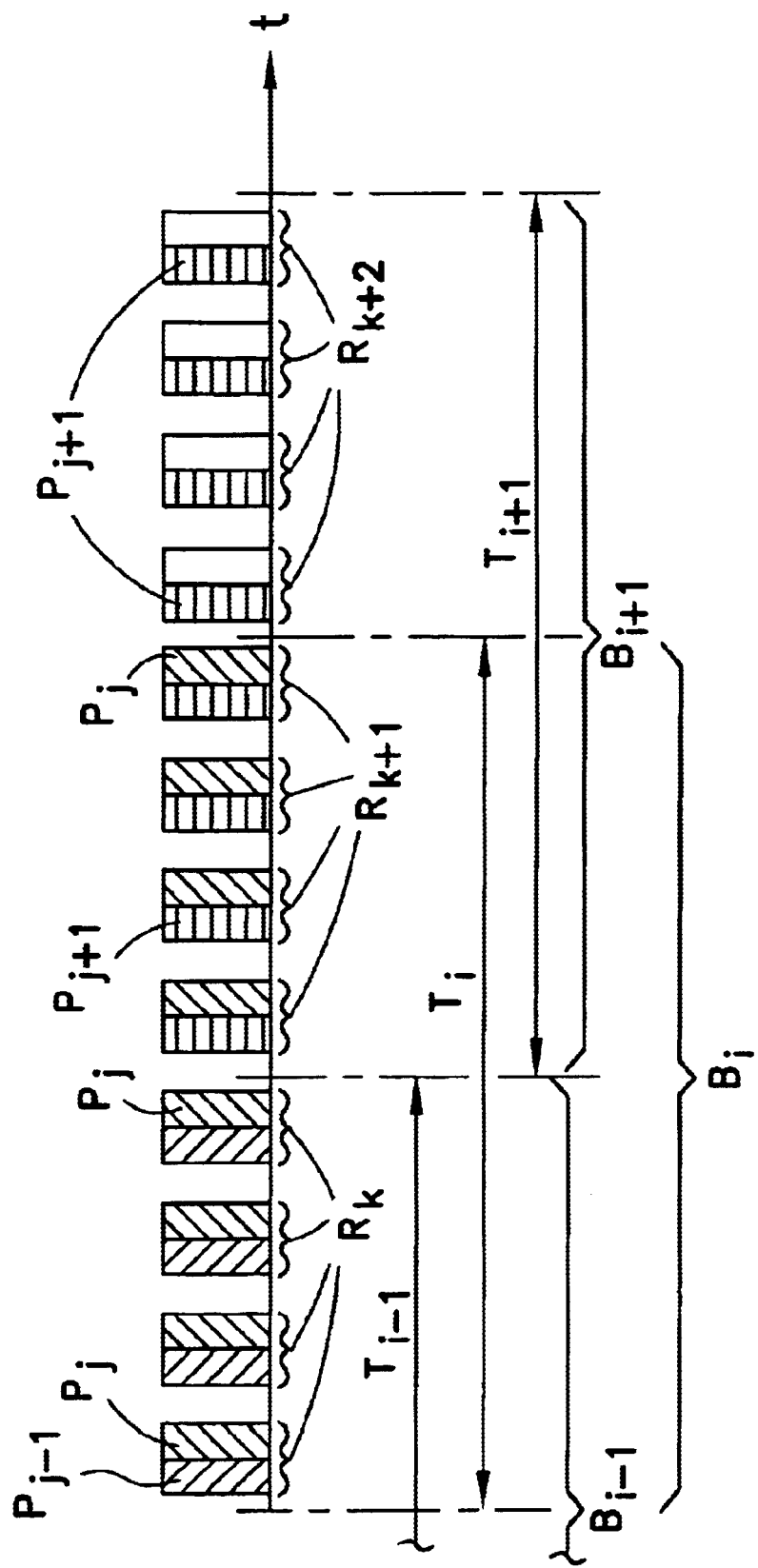

The invention will be better understood with the aid of the following description of a preferred mode of implementation of the process of the invention, with reference to the appended drawing in which:

FIG. 1 represents a GSM radiotelephony terminal for implementing the process of the invention, and FIG. 2 is a time chart illustrating the transmission of the data blocks.

The terminal of FIG. 1 allows the transmission, bidirectional in this example, of data over a medium, here the GSM radio network, 20. The data may be data provided by apparatuses connected to the terminal or produced by an electronic assembly integrated into the terminal, for a determined application, for example telefax. The data may again represent a digitized voice signal.

The terminal includes an assembly 1 for the radio transmission of data, controlling a transmit/receive radio interface 10, and an assembly 11 for receiving data originating from the network 20 through the interface 10.

The transmission assembly 1 includes a calculation block 2 receiving the data to be transmitted and chopping them into blocks Bi of determined size which are processed in a processing block 3, so as to add redundancy thereto, before chopping, in a calculation block 4, the block Bi into here four or eight packets Pj or another number depending on the nature of the data to be transmitted, and to transmit them (10) by radio (FIG. 2).

At the receiving end, in the assembly 11, a calculation block 12 receives, from the interface 10, data packets Pj transmitted by a station of the network 20 after similar processing to that performed by the assembly 1. The calculation block 12 estimates the quality of the radio link in accordance with the radio signals detected by the interface 10. Each packet Pj is thereafter sent to a calculation block 13 which performs the grouping together of the packets Pj of one and the same block Bi so as to reconstruct the original data of the block Bi transmitted.

The manner of operation of the above circuits will be explained in greater detail below.

In a general manner, the process consists:

in grouping the data to be transmitted into blocks Bi, in adding redundancy information to each block Bi to be transmitted, and in splitting the block Bi up into a determined number of bit packets Pj and, at the receiving end, an attempt is made to reconstruct the data block Bi from packets Pj received, by utilizing the redundancy information, and, furthermore, a quality is estimated in respect of the transmission of data by the radio pathway and a minimum number of packets Pj whereby it is possible to reconstruct each block Bi with the aid of the redundancy information is determined therefrom, a number of packets Pj of the block Bi which is at least equal to the minimum number is transmitted and, at the receiving end, the attempted reconstruction of the block Bi is performed by investigating a number of packets Pj corresponding to the minimum number.

For the sake of clarity of exposition, the case for which the determined number of packets Pj is systematically transmitted, that is to say that the process of the invention is then implemented only at the receiving end, will firstly be explained.

FIG. 2 illustrates, as a function of time t, the transmission of the blocks Bi in bursts Rk, Rk+1 of bits of packets Pj. This figure corresponds to a transmission, in active mode, of blocks of speech bits, each block Bi consisting of eight packets Pj transmitted in a frame Ti. The frames of successive ranks are interleaved, that is to say, apart from the service bits, the first four bursts, Rk, of the frame Ti each contain a packet Pj−1 and Pj of the respective blocks Bi−1 and Bi, while the last four bursts, Rk+1, of the frame Ti each contain a packet Pj and Pj+1 of the respective blocks Bi and Bi+1.

In order to continuously locate the terminal in quiescent mode or to exchange data in active mode, the station cyclically transmits a signalling or data block and the terminal responds thereto so as to signal a localization in a new radio zone of the network 20 or so as to return data.

We shall firstly take the example of data transmission in quiescent mode of the terminal, from the station of the GSM network 20 to the latter.

In this case, the transmission diagram of FIG. 2 is simplified in the sense that the data blocks Bi are not interleaved in the form of eight semi-bursts Rk, Rk+1 but that they are simply transmitted successively in the form of four bursts Rk (or Rk+1), then Rk+2, each with a single packet Pj, Pj+1.

The station, which may be considered to be equivalent to the terminal, transmits, via an assembly similar to the assembly 1, a block Bi of signalling data comprising 184 useful bits, which is distributed over four radio bursts Rk of bits, all of which bursts are transmitted in this example.

In order to protect against radio disturbances, the useful bits to be sent are transformed so as to add redundancy bits to each block Bi. By addition of a Fire code, 40 redundancy bits are added thereby making it possible to detect up to 40 errors and to correct up to 12 errors. The 224 bits thus obtained thereafter undergo convolutional coding in which 4 bits are added and the volume of bits is doubled, i.e. a block of 456 bits which are linked by the correlation afforded by the redundancy bits.

These 456 bits are distributed in an interleaved manner over the four bursts Rk, or packets Pj, so that the loss of a burst Rk affects block Bi in a distributed manner, that is to say the bits of a certain rank, modulo 4. The redundancy is such that two bursts Rk received error-free suffice to reconstruct the transmitted block Bi of 184 bits.

At the receiving end, the terminal estimates via the calculation block 12 the quality of the radio link and therefore that of the bits of each burst Rk so as to determine the minimum number of packets Pj necessary to reconstruct the block Bi considered. More precisely, should erroneous bits be detected, then the block Bi received can be considered as not belonging to a fictitious library of possible blocks Bi, with the correct correlation and which are therefore acceptable, which library would consist of the assembly of recognizable blocks Bi formed from the various combinations of states of the 184 useful bits.

Estimation of the quality of the radio link can be performed with regard to an aggregate of packets Pj received or else on receiving each burst Rk, so as to assign a specific quality score to each packet Pj. This estimation can for example be performed by making provision for the redundancy, which pertains globally to the block Bi, to also pertain, at least partially, to each packet Pj. At packet Pj level, provision may be made for the redundancy to allow detection and location, hence correction, of errors (with the principle of a library of packets), errors whose rate is measured directly, or else for the redundancy to be more limited and for it to allow only detection of errors, and hence estimation of the quality of the radio link, error correction being concerned only with an aggregate of packets Pj, from the redundancy at the level of block Bi.

When a packet Pj of a burst Rk received does not have the desired correlation between its bits, it is corrected if the packet redundancy so provides and if it has a limited number of errors, or else it is left as is if the number of errors is excessive. It is then the higher level redundancy, at block Bi level, which will come in.

Packet or block correction consists in tagging firstly, in accordance with the redundancy or correlation, a minimum number of bits and in correcting them, and hence permitting the 0 and 1 states of the bits to be corrected, so as to end up with the recognizable packet Pj or block Bi of bits having a correct correlation, which most resembles the packet(s) received. However, there is a nonzero probability that this was in fact a dispatching of another recognizable packet Pj or block Bi, marred by a high number of errors (greater than said minimum number of bits identified and wrongly corrected).

To avoid this kind of untoward correction, each packet Pj received is assigned a quality score as a function of the number of bits estimated to be erroneous, whether or not they are corrected. As it is very improbable that a packet Pj or block Bi transmitted is transformed nearly exactly by radio disturbances into another recognizable packet Pj or block Bi, a high quality score indicates a low probability of untoward correction.

As a variant, it is also possible to estimate the quality of the radio link in accordance with the receiving of bits other than those of the data of the blocks Bi, for example on the basis of service signals of each burst Rk exhibiting, with respect to one another or individually over time, a certain known coherence, which is checked. Hence, in this case, no direct measurement of the error rate of the packet Pj is then involved, but the latter is estimated from other data sent at the same time and serving as a sort of marker or signpost of the quality of transmission.

It is again possible to estimate the quality of the radio link by analog analysis of the radio signals received. Specifically, the latter must in principle exhibit a determined state of modulation from among the possible states of modulation corresponding to binary states. Therefore, the discrepancy between the analog signal actually received and the most similar binary state points to disturbances of the radio pathway. In the general case, the data may take the form of symbols representing a determined number of elementary symbols each of which can take a determined number of defined, quantized states. For example, four bits can be grouped together to form a symbol with sixteen possible states, this symbol serving as is for modulating transmission of the data and/or their utilization.

It is thus possible to perform an adaptive filtering of the signals received aimed at eliminating the delayed signals, or echoes, due to multipath propagation and producing intersymbol interference. The prior signal, stored, with a time shift and an attenuation which are adjusted so as to reduce each echo to a minimum, is then subtracted from the current signal received.

In short, a model of the radio pathway is created and the minimum is tracked so as to update the model.

The analog signals thus filtered are then supposed to represent the binary logic state which is closest from the analog point of view, that is to say they are quantized so as to obtain the bits of the packet Pj or block Bi.

Should a correlation error be detected, this signifies that the model of the radio pathway, serving for the correction, is at least partially erroneous or else that the radio pathway has been affected by glitches affecting the stationarity of its transmission characteristics.

It is then possible to attempt to adjust the model through an inverse operation. Specifically, knowing the quantized signals restored and corrected logically by correlation, which are in fact those which were transmitted, it is possible to transform them using the inverse model so as to obtain the analog signals which ought to have been received in view of the current model. By comparing these analog signals with those actually received, the model is adjusted so as to minimize the prediction error, and/or the quality of the model and hence the quality of the data of the packets Pj and blocks Bi is estimated. In particular, a quality score can be assigned to each bit, indicating better quality the smaller the discrepancy, or metric, between the analog signal processed by filtering and the quantized, predetermined signal of the recognized logic state. It should be noted that a double redundancy is then employed since, apart from the logic redundancy, there is also a spectrum of echoes, which make it possible if need be, this time by preserving them, to reconstruct a binary signal even if its fundamental signal for the shortest journey has not been received.

The Viterbi algorithm makes it possible, in the above example, to determine the most probable original bit sequence and furthermore provides the distance between the latter and the bits received. This distance therefore manifests a score of non-quality at reception.

The calculation block 13 receives the blocks processed as above by the block 12, together with the associated quality score. The calculation block 13 can then limit its analysis to two packets Pj so as to reconstruct the block Bi transmitted, if their quality scores are sufficiently high as to indicate a good probability of near-absence of errors. This may be the total of the quality scores which is a decision criterion for, by comparison with a threshold, refraining from the analysis of other packets Pj. In the case where the calculation block 13 has to receive a fixed number of bits, even if it does not utilize them all, the block Bi transmitted is reconstructed by previously replacing the data of the uninvestigated packets Pj by pseudo-random data associated with a score manifesting a poor quality.

In a case where the data block Bi could still be reconstructed from the two packets Pj, but where the total of the quality scores, then less than the threshold, would indicate that the corrections have a relatively high probability of having been untoward, the calculation block 13 investigates a third, and possibly a fourth, packet Pj of the block Bi, or a certain number of bits of the packet Pj, so as to refrain from correction. Within the meaning of the invention, the investigation of a packet Pj therefore corresponds to the use of a certain number of its data and not necessarily of all of them. The risk of error, estimated to be too high, in the correction of the data received is thus reduced. In this example therefore, an actual transmission error rate is estimated, in accordance with the data received, from which is deduced a risk of error in the reconstruction of the blocks Bi and an additional packet Pj is analyzed if this risk exceeds a threshold.

It will be noted that the order in which packets Pj are analyzed may be independent of the order in which they are received, even if, in this example, this order is followed.

Thus, through the process set forth above, the activity of the assembly 11 is limited since the packets Pj are not systematically analyzed.

So as to reduce, furthermore, the consumption of the radio interface 10, the calculation block 13 instructs the deactivation of the latter when a sufficient number of packets Pj has been received to reconstruct a data block Bi, that is to say it cuts reception or, more exactly, does not reactivate it at the instant scheduled in a time frame of the network 20.

This deactivation or cutting can pertain to the instant scheduled for the reception of one or more bursts Rk in any position in the set of bursts of the block Bi. This can be one or more of the last few bursts Rk of a block Bi, after analysis and recognition of first few bursts of the block Bi. Again provision may be made to instruct this cutting of reception as a function of the receiving of a prior data block Bi−1, by assuming that the quality of transmission will remain unchanged, in which case it is possible to eliminate the reception of a burst Rk of any position in the block Bi of bursts considered.

Taking now the example of the active mode, with interleaved data blocks Bi of eight packets Pj representing speech or computer data, it is thus possible to cut the reception of one at least of the four bursts Rk+1 transmitting the last four packets of the block Bi, if the quality of the packets Pj already received (Rk) of the block Bi is sufficient, thereby also cutting the reception of packet Pj+1 of block Bi+1 of this burst Rk+1 even before the quality of a sufficient number of packets of block Bi+1 could be judged. Hence, the quality of block Bi is a priori extrapolated onto block Bi+1 so as to take the decision to cut the reception of the packet Pj+1 considered and it is assumed that the subsequent packets Pj+1 will have sufficient quality. Stated otherwise, by cutting the reception of data block Bi, the reception of a packet of the subsequent data block Bi+1 is disabled. However, provision may be made for partial detection of burst Rk+1, for only one packet Pj+1 and service bits of burst Rk+1, that is to say with no packet Pj. If, however, the bits of the two packets Pj, Pj+1 were interleaved, the partial detection of burst Rk+1 would lead to a partial detection of each of the two packets Pj, Pj+1. In this case, the unreceived bits of each of the two packets Pj, Pj+1 would be processed like those of the unreceived bursts Rk.

The application of the process of the invention at the level of the transmission of the packets Pj will now be explained.

In this example, the activity of the transmission assembly 1 is also limited. To do this, when the reception assembly 11 reconstructs the block of data Bi transmitted by the station without having to investigate the entirety of the packets received of a block Bi, the transmission assembly 1, when it has to transmit data, transmits only a number of packets which is less than the maximum number, here four or eight, of packets.

More precisely, the number of packets Pj transmitted by the assembly 1 varies in the same direction as the number of packets Pj investigated at the receiving end and here it is even equal to this number, that is to say here 2, 3 (or 4) in the example of the quiescent mode.

The station of the GSM network 20 then considers, at the receiving end, that one or more packets Pj have been lost and it reconstructs the block Bi in accordance with the reduced number of packets Pj, according to what has been set forth in respect of the assembly 11.

In the case of a radio network with adjustable transmission power, the terminal may furthermore send false measurement results back up to the station, indicating somewhat weak reception, so as to prompt the latter to increase its transmission level, thereby improving the quality of the packets Pj received and thereby making it possible to utilize a limited number thereof.

Likewise, in the case of bidirectional transmissions as here, the terminal receiving the data can send to the rig which transmits them, the station, information linked with the quality of the data which it receives therefrom. It is thus possible to determine, in the terminal, an error rate for the data received, or more generally, the quality score (as the demodulation metric), and to send this score to the station by way of quality information. It is in particular possible to degrade the quality score so as to simulate an insufficiency of level received on account of glitches, before sending it to the station.

It is again possible to make provision to transmit, indirectly and in a biassed manner, the quality information in the form of a simulation, with regard to the station which transmits the data, of a radio pathway of increased attenuation.

In particular, it is possible to simulate the increase in radio attenuation by the transmission of quality information indicating a received radio signal level less than the actual level. In the case of the present example, the station transmitting the data can talk to several handsets. To avoid collisions during reception at the station, the latter defines a temporal reception frame in which it temporarily allots, to each active terminal, a time slot of determined rank, specific to the terminal. The station locks, via the down radio pathway, the instant of transmission of a burst Rk of the terminal considered to the frame (up pathway), that is to say it transmits to the terminal a transmit command which is issued in advance so as to take account of the journey time of this command and of the return journey time of the bursts Rk transmitted by the terminal. The station regulates this advance so that it receives the data in perfect register with the local time slot of the station. This advance therefore increases with the length of the radio pathway and hence, in practice, with the resulting reduction in quality.

In order to simulate a large distance and therefore increased attenuation, the terminal simulates a progressive receding for a certain time, while maintaining a delay for its transmissions despite the time-locking commands received from the station.

So long as this delay is not excessive, the station does not "go off-hook" in relation to the terminal but, on the contrary, increases its transmission level thereby allowing the terminal to receive the packets Pj with better quality and therefore to investigate fewer of them, thus increasing its endurance in terms of energy.

If the data transmitter implements the process of the invention, it being possible for transmission to be monodirectional only, it can by itself decide to strengthen the transmission so as to reduce the error rate of the radio pathway and thus increase the probability of correct reconstruction of the blocks Bi. This transmitter can be the station but equally well the terminal. Specifically, in so far as, to the strengthening of the transmission of the terminal there corresponds an improved transmission quality estimation, the (strengthened) transmission of an even more restricted number of packets Pj can culminate in a positive energy balance. The expression strengthened transmission should be understood to mean an improvement in the signal/noise ratio of the radio transmission. It may for example involve an increase in the level of the signal, but, in certain applications, it may involve an enhancement of the amplitude, phase or frequency modulation swing, or else a reduction in its speed.

What is claimed is:

1. A process for transmitting data by radio pathway between a transmitter rig and a receiver rig, through a disturbing transmission medium, in which:

the data to be transmitted are grouped into blocks (Bi), redundancy information is added to each block (Bi) to be transmitted, and the block (Bi) is split up into a determined number of bit packets (Pj) and, at the receiving end, an attempt is made to reconstruct the data block (Bi) from packets (Pj) received, by utilizing the redundancy information, a process in which:

a quality is estimated in respect of the transmission of data by the radio pathway and a minimum number of packets (Pj) whereby it is possible to reconstruct each block (Bi) with the aid of the redundancy information is determined therefrom, a number of packets (Pj) of the block (Bi) which is at least equal to the minimum number is transmitted and, at the receiving end, the attempted reconstruction of the block (Bi) is performed by investigating a number of packets (Pj) corresponding to the minimum number.

2. The transmission process as claimed in claim 1, in which a number of packets (Pj) greater than the minimum number is transmitted and, at the receiving end, at least one additional packet (Pj) is investigated should the transmission quality be insufficient.

3. The transmission process as claimed in claim 2, in which, at the receiving end, the data received are used to estimate an actual transmission error rate, from which is deduced a risk of error in the reconstruction of the blocks (Bi) and an additional packet (Pj) is investigated if this risk exceeds a threshold.

4. The transmission process as claimed in claim 1, in which, at the receiving end, the packets (Pj) are investigated in the order in which they are received.

5. The transmission process as claimed in claim 4, in which, at the receiving end, each packet (Pj) received is allocated a quality score, as a function of an estimated number of errors and the investigation of other packets is refrained from when the aggregate quality scores of the packets considered exceed a threshold.

6. The transmission process as claimed in claim 5, in which, at the receiving end, the block (Bi) of data transmitted is reconstructed by previously replacing the data of the uninvestigated packets (Pj) by pseudo-random data associated with a score manifesting a poor quality.

7. The transmission process as claimed in claim 6, in which reception of the data is cut when a number of bits of packets which is estimated, according to the quality, to be sufficient to reconstruct a data block (Bi) has been received.

8. The transmission process as claimed in claim 7, in which, while cutting the reception of said data block (Bi), the reception of a packet (Pj+1) of the subsequent data block (Bi+1) is disabled.

9. The transmission process as claimed in claim 8, in which, the data packets being transmitted in bursts (Rk+1) each comprising two packets (Pj, Pj+1) belonging to two respective blocks (Bi, Bi+1), a partial detection of burst (Rk+1) is performed by cutting the reception of bits of one at least of the packets (Pj, Pj+1).

10. The transmission process as claimed in claim 9, in which, in the case of bidirectional transmissions, the data receiver rig sends, to the data transmitter rig, information linked with the quality of the data which it receives therefrom.

11. The transmission process as claimed in claim 10, in which a quality score for the data received is determined in the data receiver rig and is sent to the data transmitter rig by way of quality information.

12. The transmission process as claimed in claim 11, in which the quality score is degraded before sending it to the transmitter rig.

13. The transmission process as claimed in claim 10, in which the quality information is generated by simulation, with regard to the data transmitter rig, of a radio pathway of increased attenuation.

14. The transmission process as claimed in claim 13, in which the increase in radio attenuation is simulated by the transmission of quality information indicating a received radio signal level less than the actual level.

15. The transmission process as claimed in claim 14, in which, the rig transmitting the data of the blocks (Bi) being devised so as to receive successive transmissions, originating from the data receiver rig, in a time slot allotted to a temporal frame for receiving said transmissions, the instants of the successive transmissions are delayed, in the data receiver rig, with respect to scheduled instants of synchronization with the frame, so as to simulate increased radio propagation time and hence attenuation.

16. The transmission process as claimed in claim 15, in which, in the case of bidirectional transmissions, when a rig reconstructs the block (Bi) of data transmitted without having to investigate the entirety of the packets (Pj) of the block (Bi), said rig, when it becomes the transmitter, transmits only a number of packets (Pj) less than said determined number.

17. The transmission process as claimed in claim 16, in which the number of packets (Pj) transmitted varies in the same direction as the number of packets analyzed at the receiving end.

18. The transmission process as claimed in claim 17, in which said numbers are equal.

19. The transmission process as claimed in claim 18, in which, when the data transmitter rig transmits a number of packets (Pj) which is less than the determined number of packets of the block (Bi), its transmission is strengthened so as to reduce the error rate of the radio pathway.

* * * * *